(12) United States Patent
Kofuji

(10) Patent No.: US 7,311,168 B2
(45) Date of Patent: Dec. 25, 2007

(54) REAR WHEEL SUPPORT STRUCTURE OF MOTORCYCLE OR THREE-WHEELED VEHICLE

(75) Inventor: Kenji Kofuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 173 days.

(21) Appl. No.: 11/234,127

(22) Filed: Sep. 26, 2005

(65) Prior Publication Data

US 2006/0065464 A1 Mar. 30, 2006

(30) Foreign Application Priority Data

Sep. 30, 2004 (JP) ............................. 2004-287138

(51) Int. Cl.
*B62K 11/00* (2006.01)
(52) U.S. Cl. .................. 180/227; 180/219; 180/226; 280/274; 280/283
(58) Field of Classification Search ............. 180/219, 180/226, 227; 280/274, 275, 283, 284
See application file for complete search history.

(56) References Cited

U.S. PATENT DOCUMENTS

| | | | | |
|---|---|---|---|---|
| 1,154,821 A | * | 9/1915 | Whiting | 280/284 |
| 1,286,252 A | * | 12/1918 | Dragner | 180/227 |
| 2,187,238 A | * | 1/1940 | Trenor | 180/228 |
| 2,636,567 A | * | 4/1953 | Porter | 180/227 |
| 3,917,313 A | * | 11/1975 | Smith et al. | 280/284 |
| 3,974,892 A | * | 8/1976 | Bolger | 180/227 |
| 4,287,960 A | * | 9/1981 | McConnell | 180/16 |
| 4,299,582 A | * | 11/1981 | Leitner | 474/109 |
| 4,322,088 A | * | 3/1982 | Miyakoshi et al. | 280/284 |

FOREIGN PATENT DOCUMENTS

JP  09-109981 A  4/1997

* cited by examiner

*Primary Examiner*—Lesley D. Morris
*Assistant Examiner*—Maurice Williams
(74) *Attorney, Agent, or Firm*—Birch, Stewart, Kolasch & Birch, LLP

(57) ABSTRACT

In a rear wheel support structure for a motorcycle or a three-wheeled vehicle in which a proximal end portion of a swing arm is vertically tiltably supported on a vehicle body frame by way of a tilting support shaft, a rear wheel is rotatably supported on the swing arm by way of a rear axle, and a rear shock absorber is interposed between the swing arm and the vehicle body frame. The comfort of the ride is enhanced by ensuring a sufficiently long effective stroke of the rear shock absorber with respect to a stroke of the rear wheel. A tilting support shaft of a swing arm is arranged behind a rear axle in the longitudinal direction of the vehicle.

20 Claims, 4 Drawing Sheets

REAR WHEEL SUPPORT STRUCTURE OF MOTORCYCLE OR THREE-WHEELED VEHICLE

CROSS-REFERENCE TO RELATED APPLICATIONS

The present non-provisional application claims priority under 35 USC 119 to Japanese Patent Application No. 2004-287138 filed on Sep. 30, 2004 the entire contents thereof is hereby incorporated by reference.

BACKGROUND OF THE INVENTION

1. Field of the Invention

The present invention relates to a rear wheel support structure for a motorcycle or a three-wheeled vehicle in which a proximal end portion of a swing arm is vertically tiltably supported on a vehicle body frame by way of a tilting support shaft, a rear wheel is rotatably supported on the swing arm by way of a rear axle with a rear shock absorber is interposed between the swing arm and the vehicle body frame.

2. Description of Background Art

In a conventional motorcycle, a front end portion of a swing arm is supported on a vehicle body frame by way of a tilting support shaft, a rear wheel is pivotally supported on a rear end portion of the swing arm, and a rear shock absorber is connected to a longitudinal intermediate portion of the swing arm. See, for example JP-A-9-109981.

In the above-mentioned structure, the tilting support shaft of the swing arm is arranged in front of the rear wheel in the longitudinal direction of the vehicle, and a rear shock absorber connecting portion is positioned behind the tilting support shaft and in front of a rear axle. Accordingly, a distance between the tilting support shaft and the rear shock absorber connecting portion of the swing arm is inevitably shorter than a distance between the tilting support shaft of the swing arm and the rear axle. Thus, an effective stroke of the rear shock absorber tends to become shorter than a tilting stroke of a rear end portion of the swing arm.

SUMMARY AND OBJECTS OF THE INVENTION

The present invention has been proposed under such circumstances and it is an object of the present invention to provide a rear wheel support structure for a motorcycle or a three-wheeled vehicle which can contribute to the enhancement of a comfortable ride by ensuring a further elongated effective stroke of a rear shock absorber with a simple structure.

To achieve the above-mentioned object, an embodiment of the present invention is directed to a rear wheel support structure of a motorcycle or a three-wheeled vehicle in which a proximal end portion of a swing arm is vertically tiltably supported on a vehicle body frame by way of a tilting support shaft, a rear wheel is rotatably supported on the swing arm by way of a rear axle with a rear shock absorber being interposed between the swing arm and the vehicle body frame. The tilting support shaft of the swing arm is arranged behind the rear axle in the longitudinal direction of the vehicle.

An embodiment of the present invention provides the tilting support shaft of the swing arm to be arranged behind the rear wheel in the longitudinal direction of the vehicle. In addition, the tilting support shaft is covered with a rear fender for covering the rear wheel from above.

In an embodiment of the present invention the swing arm extends towards a front side of the vehicle rather than the rear axle, and the rear shock absorber is connected to a front end portion of the swing arm. Still further, the vehicle body frame includes a main frame that extends towards a rear portion of the vehicle from a head pipe. The main frame has at least a rear portion extending rearwardly and downwardly in a side view of the vehicle, and the tilting support shaft is supported on a rear end of the main frame.

As described above, according to the present invention, since the tilting support shaft of the swing arm is arranged behind the rear axle or the rear wheel in the vehicle longitudinal direction, it is possible to set a distance between the tilting support shaft and the rear shock absorber connecting portion of the swing arm longer than a distance between the tilting support shaft and the rear axle. Accordingly, it is possible to ensure a sufficiently long effective stroke of the rear shock absorber with respect to the stroke of the rear wheel. Thus, the structure can ensure a sufficiently long stroke as compared to the conventional suspension structure and can set a low spring constant thus enhancing a comfortable ride.

Further, according to an embodiment of the present invention, since the tilting support shaft of the swing arm is covered with the rear fender, it is possible to neatly conceal the tilting support shaft and peripheral parts while maintaining a good appearance by making use of the rear fender whereby the tilting support shaft and the like are not present in the appearance of the vehicle thus enhancing the design value and the merchantability of the vehicle.

Further, according to an embodiment of the present invention, since the swing arm extends towards a front side of the vehicle rather than the rear axle, and the rear shock absorber is connected to the front end portion of the swing arm, it is possible to set a further elongated effective stroke of the rear shock absorber.

Further, according to an embodiment of the present invention, since the main frame that extends towards the rear portion of the vehicle from the head pipe has at least the rear portion extending rearwardly and downwardly in a side view of the vehicle, and the tilting support shaft of the swing arm is supported on the rear end of the main frame. Accordingly, it is possible to accurately support the tilting support shaft of the swing arm while setting a height position thereof as low as possible. More specifically, at a height close to the rear axle. In addition, the tilting support shaft is arranged as close as possible to the rear end of the vehicle by making use of the main frame. Further, an embodiment of the present invention provides an advantage in assuring a long effective stroke of the rear shock absorber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a mode for carrying out the present invention is explained based on an embodiment of the present invention which is illustrated in attached drawings.

In the attached drawings, FIGS. 1 to 4 illustrate one embodiment of the present invention.

Figure 1:
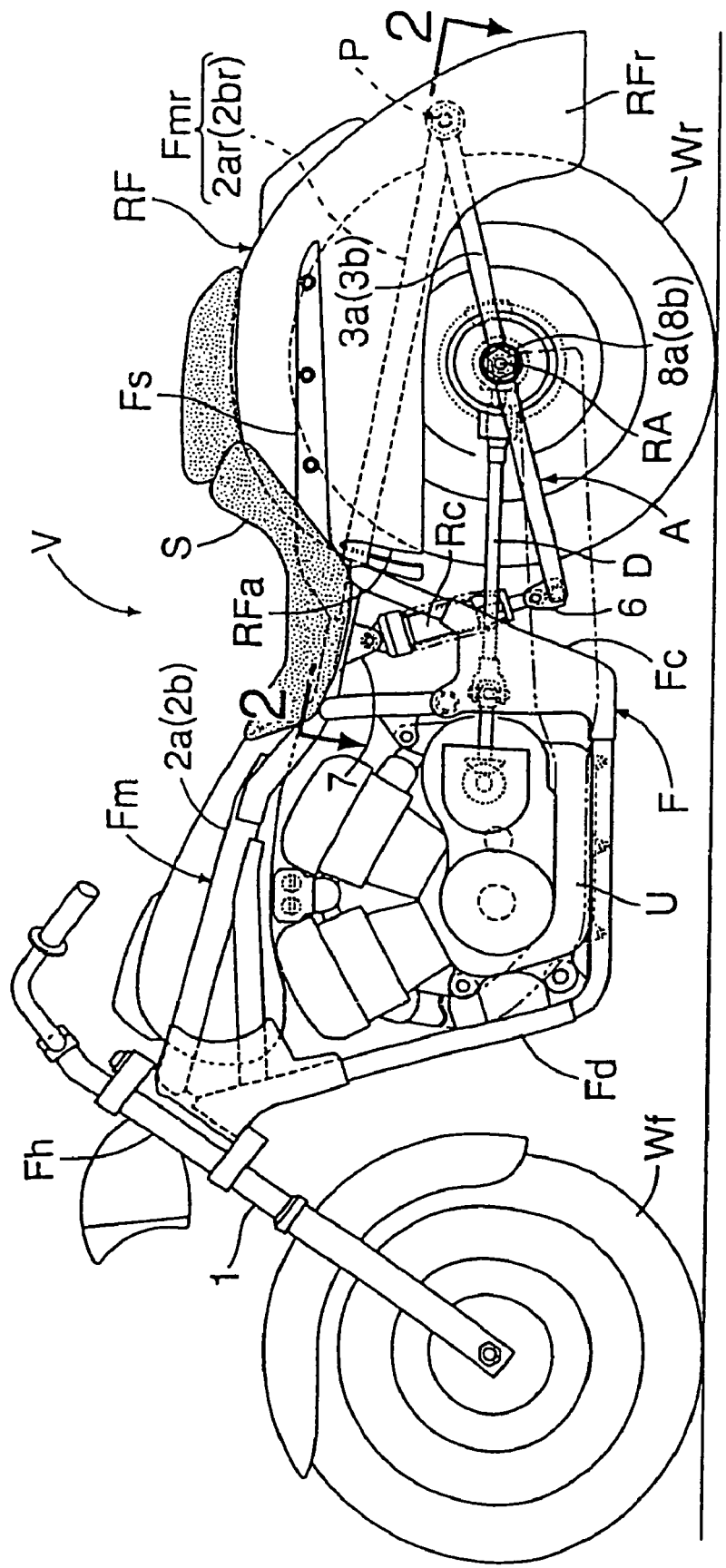
FIG. 1 is an overall side view of a motorcycle showing one embodiment of the present invention.
Figure 2:
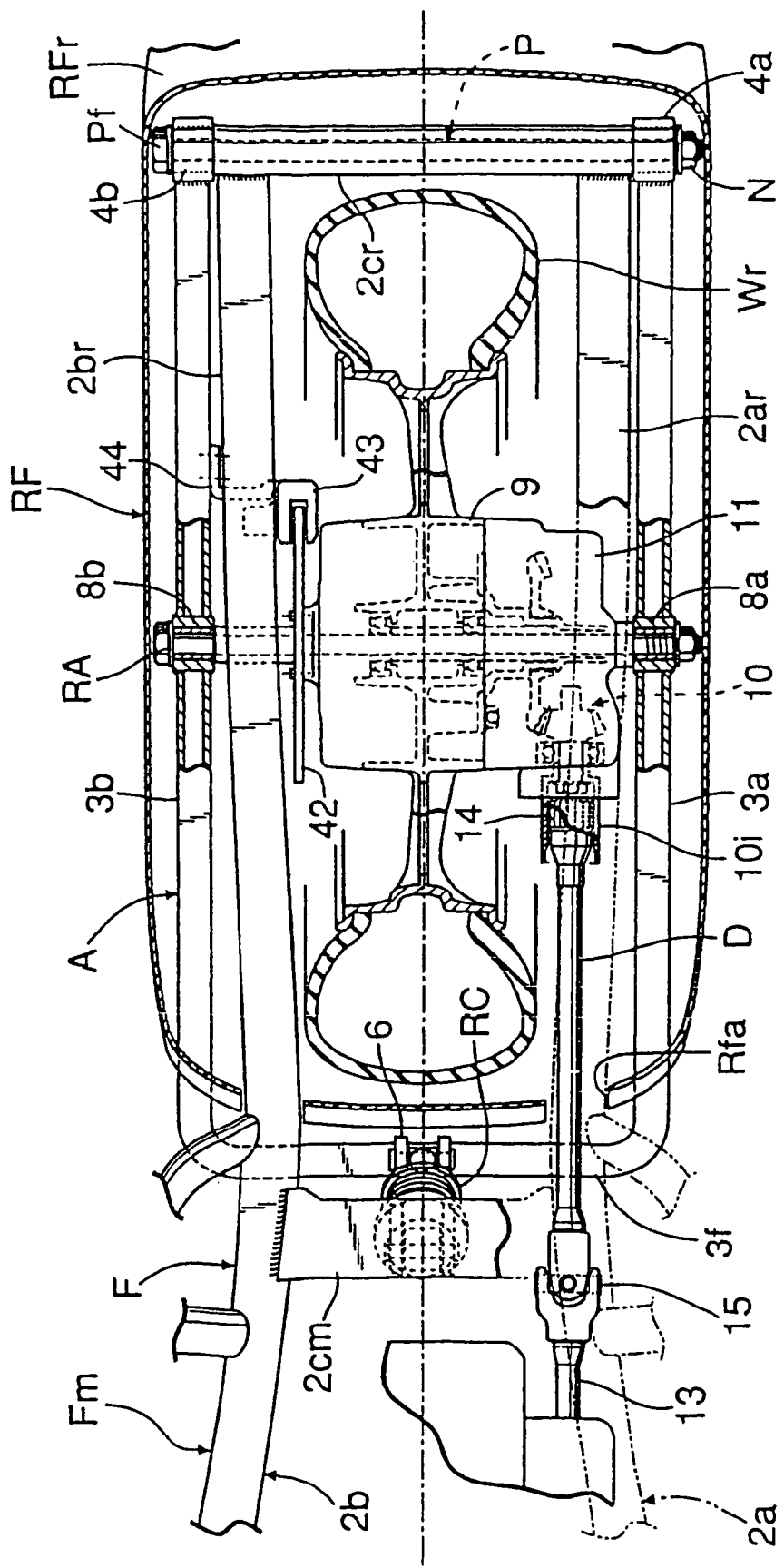
FIG. 2 is an enlarged planar cross-sectional view showing an essential part of the above-mentioned motorcycle, an enlarged cross-sectional view taken along a line 2-2 in FIG. 1.

As illustrated in FIGS. 1 and 2, a power unit U that includes an engine and a transmission is mounted on a vehicle body frame F of a motorcycle V. A front wheel Wf is rotatably and pivotally supported on a front portion of the vehicle body frame F by way of a steerable front fork 1 that includes a steering handle on an upper end thereof. Further, a rear wheel Wr is rotatably and pivotally supported on a rear portion of the vehicle body frame F by way of a swing arm A, while the rear wheel Wr and an output shaft 13 of the power unit U are connected with each other in an interlocking manner by way of a shaft-drive-type power transmission mechanism.

The vehicle body frame F includes a head pipe Fh for supporting an upper portion of the front fork 1 by a rotatable fitting engagement. A main frame Fm includes a front end thereof that is joined to the head pipe Fh that extends rearwardly and downwardly in an inclined manner while extending around an upper side of the power unit U. A down frame Fd includes a front end thereof joined to the head pipe Fh that extends rearwardly while extending around a front side and a lower side of the power unit U. A connecting frame Fc extends in the vertical direction behind the power unit U so as to join a rear end portion of the down frame Fd and front and rear intermediate portions of the main frame Fm.

The main frame Fm includes a pair of left and right main pipes 2a, 2b which have front ends thereof respectively joined to the head pipe Fh that are arranged laterally in parallel with a distance therebetween. Intermediate portions of both main pipes 2a, 2b are integrally joined to each other by way of at least one intermediate cross member 2 cm which is arranged in the longitudinal direction at an interval. Further, a proximal end portion of a support stay Fs that extends rearwardly in a slightly upwardly inclined manner from the intermediate portion of the main frame Fm is joined to an intermediate portion of the main frame Fm in the longitudinal direction. A seat S on which a rider sits and a rear fender RF which covers an upper portion of the rear wheel Wr are supported on the support stay Fs and the main frame Fm by way of connecting means not shown in the drawing.

The rear fender RF is formed in an approximately semi-circular shape in a side view and includes an inverse-U-shaped transverse cross section. Further, a notched portion RFa which allows the main frame Fm to pass therethrough in the longitudinal direction is formed in a front end portion of the rear fender RF, while an extension portion RFr which bulges downwardly is integrally connected to a rear end portion of the rear fender RF so as to sufficiently cover a tilting support portion of the swing arm A and the like as described later.

Figure 3:
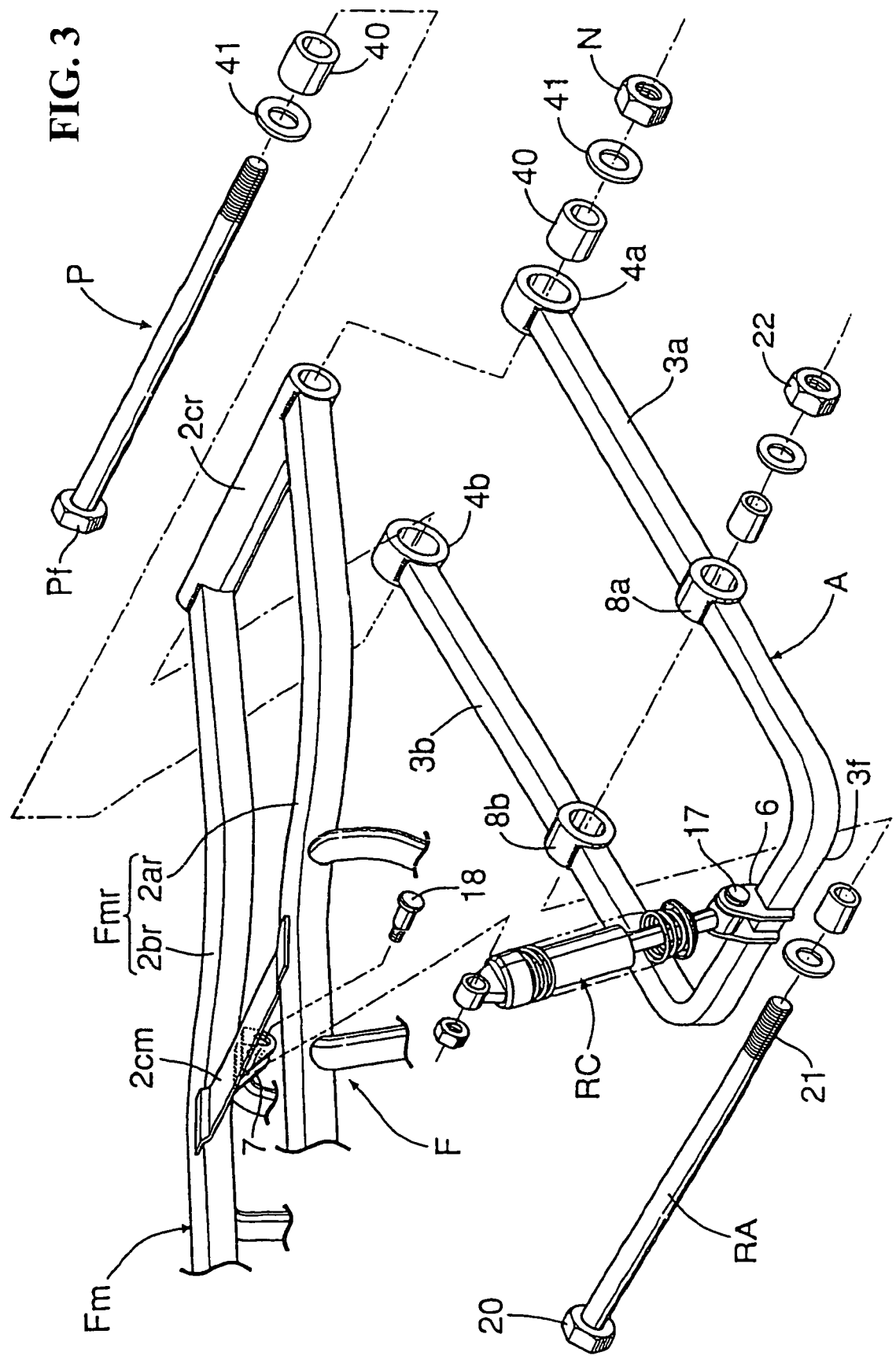
FIG. 3 is an exploded perspective view of an essential part of the above-mentioned motorcycle.
Figure 4:
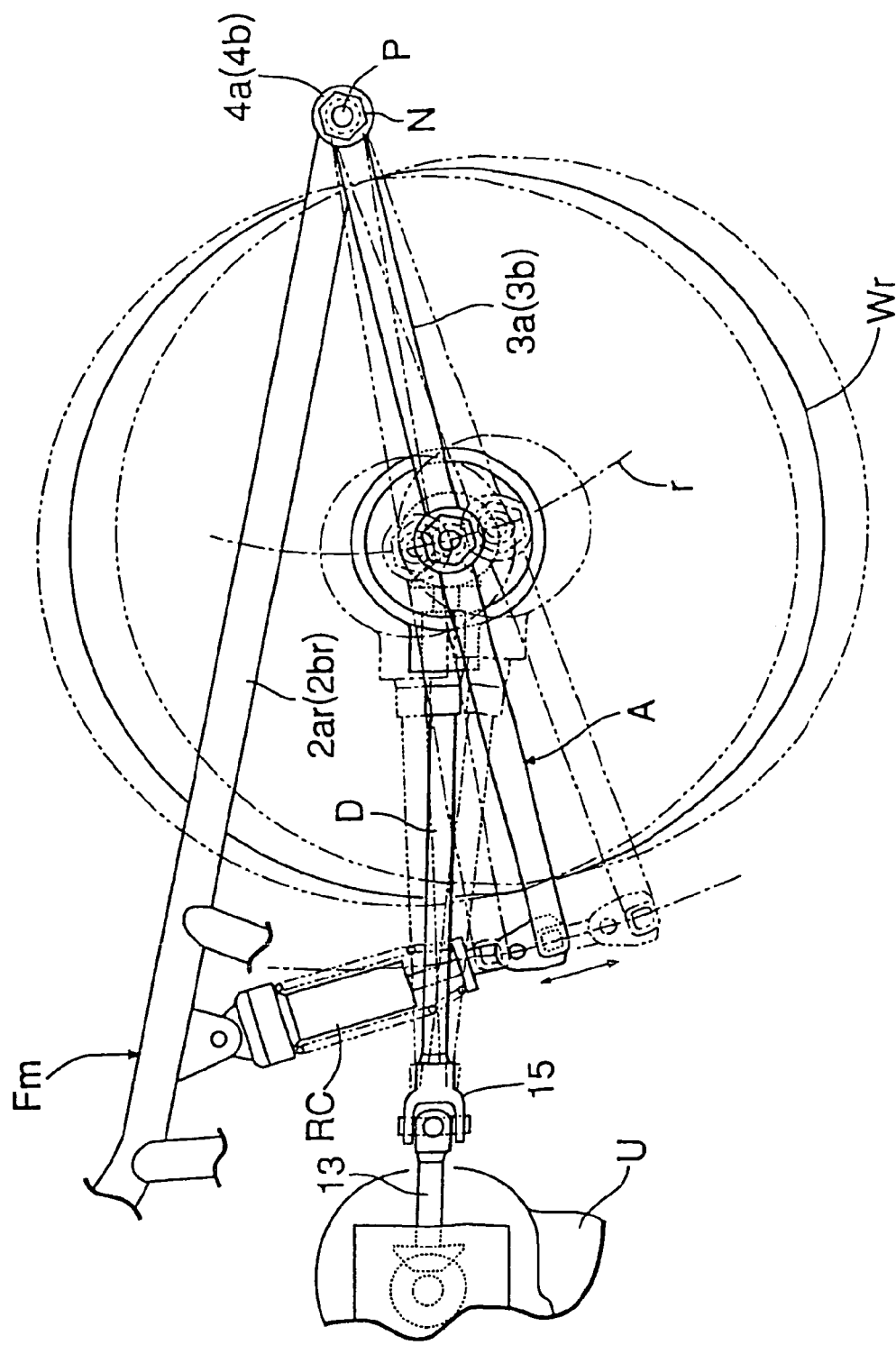
FIG. 4 is a side view of an essential part schematically showing the displacements of respective portions when a swing arm is tiltably displaced.

Next, the support structure of the swing arm A which uses the main frame Fm and the support structure of the rear wheel Wr which uses the swing arm A are specifically explained also in conjunction with FIGS. 3 and 4.

The main frame Fm has a rear portion Fmr thereof which is positioned further behind a joint portion between the main frame Fm and the connecting frame Fc that are inclined rearwardly and downwardly. The rear portion Fmr extends close to the rear end of the vehicle. Rear half portions 2ar, 2br of the pair of left and right main pipes 2a, 2b, which constitute the rear portion Fmr, are arranged to be approximately parallel to left and right sides of an upper half portion of the rear wheel Wr. At the same time, the rear ends of the rear half portions 2ar, 2br are integrally joined by way of a rear-end cross member 2cr. The rear half portions 2ar, 2br and the rear end cross member 2cr are covered with the above-mentioned rear fender RF from above and from the sides.

The rear-end cross member 2cr of the main frame Fm is formed into a cylindrical pipe which has both ends thereof opened and is positioned behind the rear axle RA (further behind a tire portion of the rear wheel Wr in the illustrated example), wherein a tilting support shaft P of the swing arm A is fitted in and supported by an inner peripheral surface of the rear-end cross member 2cr in a state wherein a relative rotation of the tilting support shaft P is allowed.

The swing arm A is formed in an approximately U-shape in a plan view and includes a pair of left and right pipe-shaped side frames 3a, 3b which extend in substantially a longitudinal direction along left and right sides of the rear wheel Wr in a state wherein the side frames 3a, 3b are inclined frontwardly and downwardly. A pipe-shaped front frame 3f integrally joins front ends of the side frames 3a, 3b. To rear ends of the left and right side frames 3a, 3b, a pair of left and right bearing pipes 4a, 4b are provided to both left and right sides of the above-mentioned rear-end cross member 2cr and are aligned coaxially on the same axis as are respectively integrally joined. The bearing pipes 4a, 4b and the rear-end cross member 2cr which is interposed therebetween are connected to each other by way of the tilting support shaft P in a state wherein the three elements are allowed to perform the relative rotation with respect to the tilting support shaft P which penetrates the three elements. Accordingly, rear end portions of the swing arm A are vertically tiltably supported on the vehicle body frame F (the rear end portion of the main frame Fm) by way of the tilting support shaft P.

Further, removal preventing means are respectively provided to both ends of the tilting support shaft P. That is, in the illustrated example, while an angular head portion Pf is integrally formed on one end of the tilting support shaft P, a nut N is threaded on a threaded portion formed on another end of the tilting support shaft P, and the removal of the tilting support shaft P from the bearing pipes 4a, 4b and the rear-end cross member 2cr can be prevented by fastening the nut N. Here, in the respective bearing pipes 4a, 4b, collars 40, which are formed slightly longer than the bearing pipes 4a, 4b for allowing the tilting support shaft P to pass therethrough, are fitted in. Since the nut N is fastened by way of a thrust washer 41, which is engaged with an outer end of the collar 40, the smooth tilting of the swing arm A with respect to the vehicle body frame F (the rear-end cross member 2cr) is allowed also by such fastening.

The front frame 3f of the swing arm A traverses a space in front of the tire portion of the rear wheel Wr in the lateral direction. A support bracket 6 is provided which is fixedly secured to an approximately center portion of the front frame 3f. A lower end portion of a rear shock absorber RC, which constitutes a movable end, is pivotally connected by way of a pivot pin 17 in a relatively rotatable manner. The rear shock absorber RC is arranged in the vertical direction in a vehicle body space defined between the power unit U and the rear wheel Wr, wherein an upper end portion of the rear shock absorber RC which constitutes a fixed end is pivotally connected in a relatively rotatable manner to a support bracket 7 which is fixedly secured to a longitudinal intermediate portion of the main frame F (an intermediate cross member 2c between the pair of left and right main pipes 2a, 2b in the illustrated example). Here, as the rear shock absorber RC, in the illustrated example, a conventionally well-known structure is used which interposes a coil-shaped suspension spring and a hydraulic damper in parallel with each other between the movable end and the fixed end.

Further, to longitudinal intermediate portions of the pair of left and right side frames 3a, 3b of the swing arm A, a pair of left and right boss-shaped support sleeves 8a, 8b which are arranged on a coaxial line are respectively integrally joined. On inner peripheral surfaces of the support sleeves 8a, 8b, both left and right outer end portions of the rear axle RA which penetrates and rotatably supports a hub portion 9 of the rear wheel Wr are respectively fitted and supported. A head portion 20 for engaging with a tool is formed on one end of the rear axle RA, while a threaded shaft portion 21 is formed on another end of the rear axle RA. By allowing the nut 22 to be engaged with the threaded shaft portion 21 and fastening the nut 22, the rear axle RA is fastened and mounted to the swing arm A.

Next, the hub portion 9 of the rear wheel Wr is fitted and supported on a center portion of the rear axle RA in a relatively rotatable manner, while a gear casing 11 which covers an open end of the hub portion 9 and incorporates a bevel gear mechanism 10 therein is fitted and supported on one lateral side of the hub portion 9 in a relatively rotatable manner. Further, between neighboring end portions of the hub portion 9 and the gear casing 11, seal means such as a labyrinth seal (not shown in the drawing) for sealing a gap therebetween while allowing for a relative rotation therebetween is interposed.

Further, to another lateral side of the hub portion 9, a brake disc 42 which is arranged coaxially with the hub portion 9 is fixedly secured. A brake caliper 43 which is capable of braking the rear wheel Wr by clamping an outer peripheral portion of the brake disc 42 is fixedly supported on the swing arm A (one side frame 3b) by way of a brake bracket 44. Here, a conventionally well-known drum brake mechanism may be adopted in place of a disc brake mechanism.

In the inside of the above-mentioned gear casing 11, an input shaft 10i which constitutes an input portion of the bevel gear mechanism 10 is directed frontwardly and is rotatably supported, wherein the input shaft 10i and a rear end portion of a drive shaft D which extends in the longitudinal direction are joined by spline fitting 14 in an axially slidable manner and in a relatively non-rotatable manner. In addition, a front end portion of the driver shaft D and the output shaft 13 of the power unit U are tiltably connected with each other by way of a universal joint 15.

An output portion of the bevel gear mechanism 10 is connected with the hub portion 9 of the rear wheel Wr in a state wherein the output portion is integrally rotated with the hub portion 9. Accordingly, an output of the power unit U is transmitted to hub portion 9 of the rear wheel Wr sequentially by way of the output shaft 13, the universal joint 15, the drive shaft D and the bevel gear mechanism 10. Thus, it is possible to rotate the rear wheel Wr without troubles.

Next, the manner of operation of the above-mentioned embodiment is explained.

When the rear wheel Wr bounds vertically in response to the unevenness of a road surface along which the motorcycle V is traveling, the swing arm A is vertically tilted about the tilting support shaft P mounted on a rear end of the swing arm A in an interlocking manner with the bounding of the rear wheel Wr. An impact generated in such an occasion is absorbed or alleviated by the rear shock absorber unit RC so that it is possible to ensure a comfortable riding.

In such a vertical tilting of the swing arm A, although the rear axle RA which is supported on the longitudinal intermediate portion of the arm A is vertically and tiltably displaced about the tilting support shaft P following the arm A, the gear casing 11 which is fitted and supported on the rear axle RA is more or less rotated relative to the rear axle RA such that the input shaft 10i which projects from the front end of the gear casing 11 maintains a coaxial relationship with the drive shaft D (that is, the input shaft 10i is directed to a bending point of the universal joint 15).

Thereafter, since the rear axle RA moves vertically along an arcuate locus r about the tilting support shaft P, the relative displacement in the longitudinal direction is generated between the gear casing 11 (accordingly, the input shaft 10i) on the rear axle RA and the drive shaft D along with such vertical movement. However, such relative displacement can be absorbed without difficulty since the spline fitting portion 14 interposed between the front end portion of the input shaft 10i and the rear end portion of the drive shaft D performs a relative sliding movement in the axial direction.

In this embodiment, since the tilting support shaft P of the swing arm A is arranged behind the tire portion of the rear wheel Wr in the vehicle longitudinal direction, it is possible to take the sufficiently long distance between the tilting support shaft P and the rear shock absorber connecting portion 17 of the swing arm A compared to the distance between the tilting support shaft P and the rear axle RA. As a result, it is possible to ensure the sufficiently long effective stroke of the rear shock absorber RC compared to the stroke (vertical displacement) of the rear wheel Wr. Thus, the suspension structure of this embodiment can take a longer stroke as compared to the conventional suspension structure. Accordingly, the spring constant can be set at a low value. Thus, the suspension structure is advantageous in enhancing the comfort of the ride.

Further, in the illustrated example, the rear fender RF covers the tilting support portion of the swing arm A and a peripheral portion thereof (that is, the tilting support shaft P, the bearing pipes 4a, 4b which support the tilting support shaft P, the rear-end cross member 2cr and, further, the main frame rear portion Fmr in the periphery of the rear-end cross member 2cr and the rear portion of the swing arm A). Thus, it is possible to conceal these portions while maintaining a good appearance by making use of the rear fender RF. Accordingly, the tilting support portion of the swing arm A and the like are not present in the appearance of the vehicle thus enhancing the design value of the vehicle and the merchantability of the vehicle.

Further, the swing arm A also extends forwardly in the longitudinal direction of the vehicle as compared to the rear axle RA (the front end portion of the rear wheel Wr in the illustrated drawing) and the rear shock absorber RC is connected to the front end portion of the swing arm A. Thus, it is possible to further elongate the effective stroke of the rear shock absorber RC.

Further, in the illustrated example, the rear portion of the main frame Fm which extends toward the rear portion of the vehicle from the head pipe Fh extends rearwardly and downwardly in a side view of the vehicle, and the tilting support shaft P of the swing arm A is supported on the rear end of the main frame Fm. Accordingly, it is possible to accurately support the tilting support shaft P of the swing arm A while setting a height position thereof as low as possible (that is, at a height close to the rear axle RA) and arranging the tilting support shaft P as a position close to the rear end of the vehicle by making use of the main frame Fm. Further, the embodiment is advantageous in assuring a long effective stroke of the rear shock absorber.

Although the embodiment of the present invention is explained in detail heretofore, the present invention is not limited to the above-mentioned embodiment and various design changes can be made.

For example, although the above-mentioned respective embodiments describe a case in which the present invention is applied to the rear wheel support structure of the motorcycle, the present invention may be applied to the rear wheel support structure of the three-wheeled vehicle.

Further, in the above-mentioned embodiment, the structure in which the tilting support shaft P of the swing arm A is arranged behind the tire portion of the rear wheel Wr has been explained. However, according to an embodiment of the present invention, it is sufficient that the tilting support shaft P is arranged behind at least the rear axle RA. This embodiment is also advantageous for ensuring the long effective stroke of the rear shock absorber RC compared to the conventional example.

Further, in the above-mentioned embodiment, the structure in which the rear axle RA is fitted and supported on the circular holes of the support sleeves 8a, 8b formed in the swing arm A has been explained. However, the holes formed in the support sleeves 8a, 8b may be formed as elongated holes which extend in the longitudinal direction (longitudinal direction of the swing arm) so as to enable the longitudinal adjustment for connecting and fixing the position of the rear axle RA to the swing arm A within a range of the elongate holes.

Further, in the above-mentioned embodiment, the structure in which the movable end (the lower end) of the rear shock absorber RC is directly pivotally connected to the swing arm A has been explained. However, in the present invention, the movable end (the lower end) of the rear shock absorber RC and the swing arm A may be connected with each other by way of a link mechanism such as a so-called pro-link so as to further enhance a comfortable ride.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel support structure for a motorcycle or a three-wheeled vehicle comprising:
    a swing arm having a proximal end portion;
    a tilting support shaft for vertically tiltably supporting the proximal end portion of the swing arm;
    a rear wheel being rotatably supported on the swing arm by a rear axle, and
    a rear shock absorber being interposed between the swing arm and the vehicle body frame;
    wherein the tilting support shaft of the swing arm is arranged behind the rear axle in the longitudinal direction of the vehicle,
    wherein the swing arm extends towards a front side of the vehicle relative to the rear axle, and the rear shock absorber is connected to a front end portion of the swing arm.

2. The rear wheel support structure for a motorcycle or a three-wheeled vehicle according to claim 1, wherein the tilting support shaft of the swing arm is arranged behind the rear wheel in the longitudinal direction of the vehicle.

3. The rear wheel support structure for a motorcycle or a three-wheeled vehicle according to claim 1, wherein the tilting support shaft is covered with a rear fender for covering the rear wheel from above.

4. The rear wheel support structure for a motorcycle or a three-wheeled vehicle according to claim 2, wherein the tilting support shaft is covered with a rear fender for covering the rear wheel from above.

5. A rear wheel support structure for a motorcycle or a three-wheeled vehicle, comprising:
    a swing arm having a proximal end portion;
    a tilting support shaft for vertically tiltably supporting the proximal end portion of the swing arm;
    a rear wheel being rotatably supported on the swing arm by a rear axle, and
    a rear shock absorber being interposed between the swing arm and the vehicle body frame;
    wherein the tilting support shaft of the swing arm is arranged behind the rear axle in the longitudinal direction of the vehicle,
    wherein the vehicle body frame includes a main frame which extends towards a rear portion of the vehicle from a head pipe, the main frame has at least a rear portion extending rearwardly and downwardly in a side view of the vehicle, and the tilting support shaft is supported on a rear end of the main frame.

6. The rear wheel support structure for a motorcycle or a three-wheeled vehicle according to claim 1, wherein the vehicle body frame includes a main frame which extends towards a rear portion of the vehicle from a head pipe, the main frame has at least a rear portion extending rearwardly and downwardly in a side view of the vehicle, and the tilting support shaft is supported on a rear end of the rear portion of the main frame.

7. A rear wheel support structure for a vehicle comprising:
    a swing arm having a proximal end portion and a distal end portion;
    a tilting support shaft for vertically tiltably supporting the proximal end portion of the swing arm; and
    a rear shock absorber being interposed between the swing arm and a vehicle body frame;
    wherein the tilting support shaft of the swing arm is arranged behind a rear axle in the longitudinal direction of the vehicle, and wherein the swing arm extends towards a front side of the vehicle relative to the rear axle, and the rear shock absorber is connected to a front end portion of the swing arm.

8. The rear wheel support structure for a vehicle according to claim 7, wherein the tilting support shaft of the swing arm is arranged behind a rear wheel in the longitudinal direction of the vehicle.

9. The rear wheel support structure for a vehicle according to claim 7, wherein the tilting support shaft is covered with a rear fender for covering the rear wheel from above.

10. The rear wheel support structure for a vehicle according to claim 8, wherein the tilting support shaft is covered with a rear fender for covering the rear wheel from above.

11. The rear wheel support structure for a vehicle according to claim 1, wherein the swing arm is U-shaped and opens toward a rear of the vehicle.

12. The rear wheel support structure for a vehicle according to claim 1, wherein the tilting support shaft extends through openings on the proximal end portion of the swing shaft.

13. The rear wheel support structure for a vehicle according to claim 1, wherein the swing arm slopes upwardly and rearwardly from a lower end of rear shock absorber to the tilt support shaft.

14. The rear wheel support structure for a vehicle according to claim 5, wherein the swing arm is U-shaped and opens toward a rear of the vehicle.

15. The rear wheel support structure for a vehicle according to claim 5, wherein the tilting support shaft extends through openings on the proximal end portion of the swing shaft.

16. The rear wheel support structure for a vehicle according to claim 5, wherein the swing arm slopes upwardly and rearwardly from a lower end of rear shock absorber to the tilt support shaft.

17. The rear wheel support structure for a vehicle according to claim 7, wherein the swing arm is U-shaped and opens toward a rear of the vehicle.

18. The rear wheel support structure for a vehicle according to claim 7, wherein the tilting support shaft extends through openings on the proximal end portion of the swing shaft.

19. The rear wheel support structure for a vehicle according to claim 7, wherein the swing arm slopes upwardly and rearwardly from a lower end of rear shock absorber to the tilt support shaft.

20. The rear wheel support structure for a vehicle according to claim 7, wherein the vehicle body frame includes a main frame which extends towards a rear portion of the vehicle from a head pipe, the main frame has at least a rear portion extending rearwardly and downwardly in a side view of the vehicle, and the tilting support shaft is supported on a rear end of the main frame.

* * * * *